Figure 1:
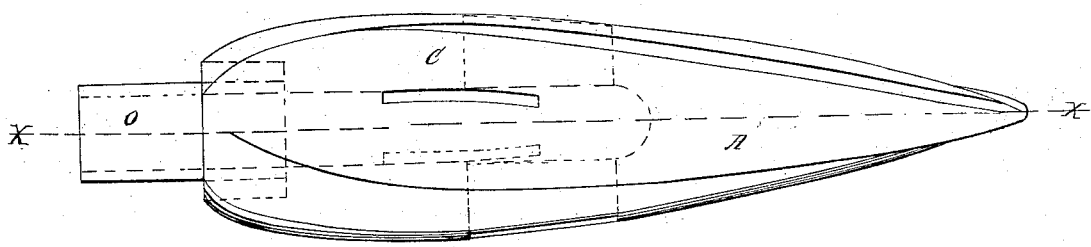
Figure 2:
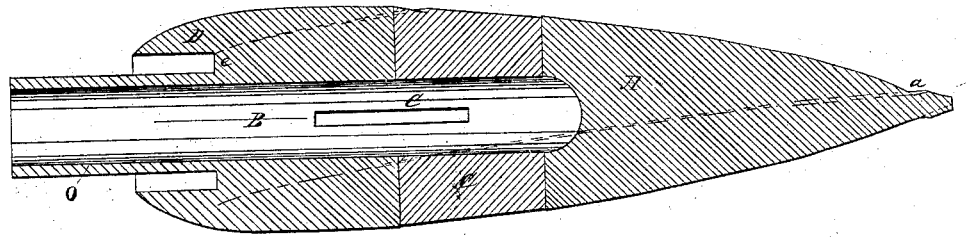

Houghton & Lewis,
Well Tubing

Nº 51,051.  Patented Nov. 21, 1865.

Witnesses:
H. W. Pettibone
Abut Shay

Inventor:
Charles Houghton
R. S. Lewis

UNITED STATES PATENT OFFICE.

CHARLES HOUGHTON AND ROBERT S. LEWIS, OF ATTICA, NEW YORK.

IMPROVED RESERVOIR-DRILL FOR TUBE-WELLS.

Specification forming part of Letters Patent No. 51,051, dated November 21, 1865.

*To all whom it may concern:*

Be it known that we, CHARLES HOUGHTON and ROBERT S. LEWIS, of the town of Attica, county of Wyoming, and State of New York, have invented a new and Improved Reservoir-Drill for Tube-Wells; and we do hereby declare that the following is a full, clear, and exact description thereof, reference being had to the accompanying drawings, and to the letters of reference marked thereon, in which—

Figure I is a geometrical perspective view of our improved reservoir-drill for tube-wells. Fig. II is a longitudinal vertical section taken from the line $x\ x$.

The nature of our invention consists in constructing in a peculiar and novel manner a drill which is provided with a reservoir for tube-wells. These drills we usually make of cast-iron with chilled points, or wrought-iron with steel points, with perforations or slots for the induction of water, which is secured to an iron tube of any convenient size, and driven into the ground in any light or gravely soil to any required depth.

To enable others skilled in the art to make and use our invention we will proceed to describe its construction and operation.

Letters of like name and kind represent like parts in the drawings.

A represents the body of our improved reservoir-drill, which we usually make of cast-iron with the lower end or point chilled, so as not to become battered by stone as it is driven into the ground. It may also be made of wrought-iron with a steel point. This drill is chambered out, forming a cavity, B, into which the perforations or slots C are made through the shell for the induction of water.

This reservoir-drill is provided with lips of a spiral form running longitudinally with the body of the drill. The object of these lips are to produce a spiral motion to the drill, and also to the pipe or tube as it is driven into the ground, thus having a tendency to keep the drill and tube loosened as the drill and tube are driven into the ground. These lips have their termination at the point $a$ of the drill.

O is a shank formed at the base of the cone, which may be inserted into the tube. There is a flange, D, that surrounds the tube. This serves the purpose to keep the tube from being battered and spreading as it is driven into the ground. It may here be observed that this shank may be dispensed with and the tube screwed to the inside of the flange, the bottom of tube resting on the shoulder $e$ of the drill.

When the drill has been driven into the ground to its required depth, as described, a pump of ordinary construction may be attached to said tube, when water may be raised therefrom.

Having thus described our invention, what we claim, and desire to secure by Letters Patent of the United States, is—

A conical reservoir-drill, with perforations or other equivalents for admitting the water to said reservoir, provided with a flange that fits around the pipe at its connection therewith, for the purposes and substantially as herein described.

CHARLES HOUGHTON.
R. S. LEWIS.

Witnesses:
H. W. PETTIBONE,
ALBERT KRAUSS.